United States Patent
Chang et al.

(10) Patent No.: US 7,263,468 B2
(45) Date of Patent: Aug. 28, 2007

(54) METHOD FOR STORING ACCESS RECORD IN NETWORK COMMUNICATION DEVICE

(75) Inventors: Cheng-Han Chang, Shi Chi Ciry (TW); Tsun-Chin Cheng, Shi Chi Ciry (TW); Chien-Hsing Liu, Shi Chi (TW)

(73) Assignee: ICP Electronics Inc. (TW)

( * ) Notice: Subject to any disclaimer, the term of this patent is extended or adjusted under 35 U.S.C. 154(b) by 691 days.

(21) Appl. No.: 10/783,870

(22) Filed: Feb. 20, 2004

(65) Prior Publication Data
US 2005/0071538 A1   Mar. 31, 2005

(30) Foreign Application Priority Data
Sep. 30, 2003   (TW) .............................. 92127098 A

(51) Int. Cl.
*G06F 12/00*   (2006.01)

(52) U.S. Cl. ...................... 702/187; 702/186; 702/188; 710/36; 711/100

(58) Field of Classification Search ................ 702/187, 702/186
See application file for complete search history.

(56) References Cited

U.S. PATENT DOCUMENTS

| | | | |
|---|---|---|---|
| 6,757,695 B1 * | 6/2004 | Noveck et al. | 707/200 |
| 7,093,060 B2 * | 8/2006 | Liu et al. | 711/100 |
| 2002/0156984 A1 * | 10/2002 | Padovano | 711/148 |
| 2004/0254954 A1 * | 12/2004 | Gatto et al. | 707/104.1 |

\* cited by examiner

*Primary Examiner*—Hal Wachsman
(74) *Attorney, Agent, or Firm*—Brinks Hofer Gilson & Lione

(57) ABSTRACT

A method of storing a data access record is described. The method of storing the records employs a micro control unit (MCU) to execute the control steps of the data access records and store the records in a non-volatile random access memory (NVRAM) in the network communication device. The boot timing is written in the NVRAM while a host system starts up and is used to login one or more client computer systems. The data access records are completely written in the NVRAM of the network communication device when the client computer systems are controlled by the host computer system. Additionally, the data access records stored in the NVRAM can be exported to a network attached storage (NAS) to expand the capacity of the NVRAM when the storage capacity for the data access records runs out or backup timing is due.

18 Claims, 4 Drawing Sheets

METHOD FOR STORING ACCESS RECORD IN NETWORK COMMUNICATION DEVICE

BACKGROUND OF THE INVENTION

1. Field of Invention

The present invention relates to a method for storing an access record. More particularly, the present invention relates to a storing method used in a network communication device.

2. Description of Related Art

Before the Internet became widely used, most computers were not capable of accessing the Internet. Now that the Internet is widespread, many communication interfaces are developed for accessing the Internet, such as Ethernet. The tremendous change and development on the computer technology makes the old model personal computer capable to access the internet by replacing its motherboard only.

However, updating a complicated computer system is costly and time-wasting when an outdated computer system can't access the Internet. Therefore, a network communication device is developed for outdated computer systems due to demands as mentioned above. For example, a network communication device can be added to some industrial personal computers (IPCs) equipped with serial port RS-232 so as to access the Internet.

However, a management problem occurs in the IPCs because it is connected to the Internet. A user logged into a computer system can do anything at will without access record. Or if hackers crack the computer system and disturb or destroy operations, no access record is left to trace or recover the damage of the computer system.

SUMMARY OF THE INVENTION

It is therefore an objective of the present invention to provide a method for storing access records so as to protect the client system's security.

It is another an objective of the present invention to provide a method for storing access records so as to maintain client system in accordance with the access records.

In accordance with the foregoing and other objectives of the present invention, a method for storing an access record is applied in a network communication device. The method of storing the records employs a micro control unit (MCU) to execute the control steps of the data access records and store the records in a non-volatile random access memory (NVRAM) in the network communication device. The boot timing is written in the NVRAM when a host system starts up and is used to login one or more client computer systems. The data access records are completely written in the NVRAM of the network communication device when the client computer systems are controlled by the host computer system. Additionally, the data access records stored in the NVRAM can be exported to a network attached storage (NAS) to expand the capacity of the NVRAM when the storage capacity for the data access records runs out or backup timing is due.

Because Internet Protocol address and identification data are recorded in the NVRAM of the network communication device, the portable network communication device can be attached to other host systems so as to control the same client systems without further setting acts. Moreover, the present invention can export the access records in NVRAM of the network communication device to the NAS, which is located anywhere.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
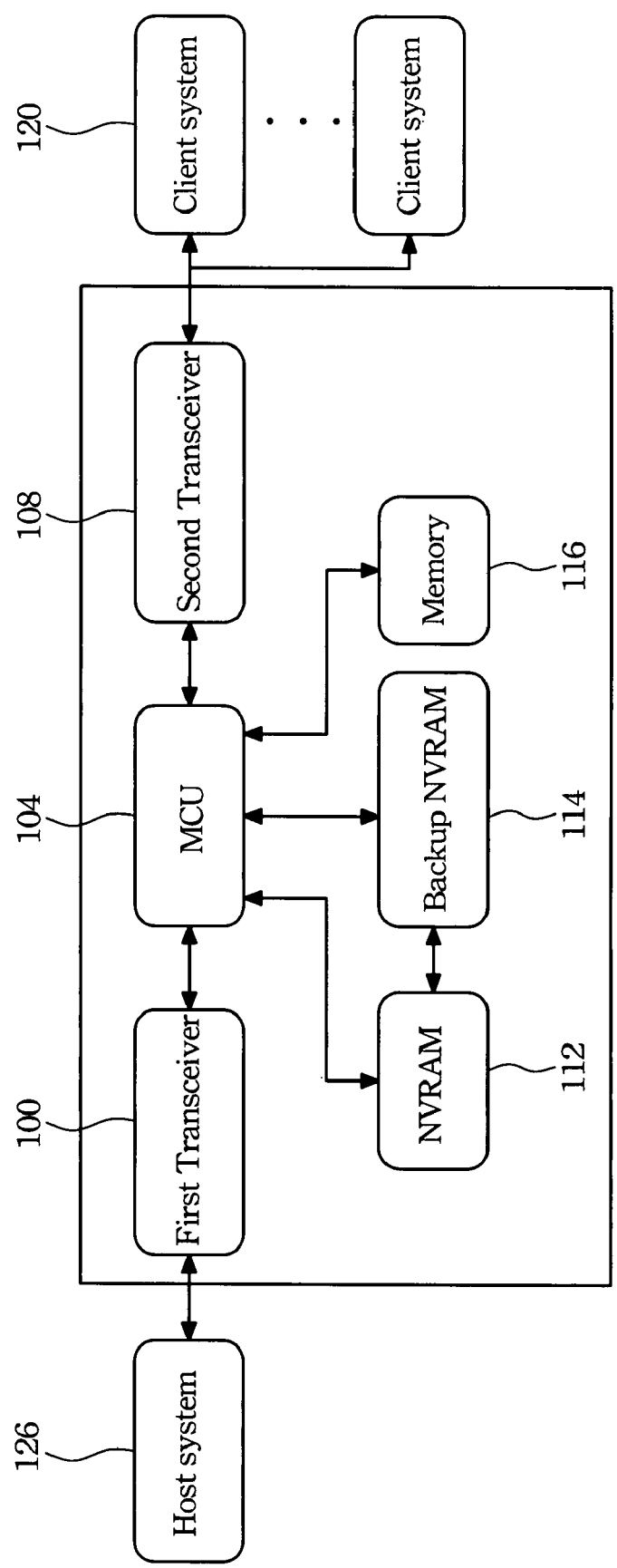
FIG. 1 illustrates a perspective view of a network communication device according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

In order to equip a network communication device with access record storing function, the present invention provide a method for storing an access record in a non-volatile random access memory (NVRAM) of the network communication device. The present invention further provides a method to expand storage capacity of the NVRAM by exporting an access record to a network attached storage (NAS) via the Internet (wire or wireless).

FIG. 1 illustrates a perspective view of a network communication device according to one preferred embodiment of this invention. The network communication device includes a Micro Control Unit 104 (hereafter MCU) for processing signal converting between conventional communication interface and Internet. A first transceiver 100 is electrically connected to a host system 126 by means of a connector (not illustrated in drawings) while the first transceiver 100 is also electrically connected to the MCU 104. The MCU 104 is employed to conduct two-way exchange of signals between the host system 126 and the MCU 104. A second transceiver 108 serves as an interface between a client system 120 and the MCU 104. Memory 116 serves as a buffer for data while the MCU is processing so as to accelerate computing speed of the MCU 104. A NVRAM 112 or a backup NVRAM 114 can be a flash memory, a floppy disk or a hard disk drive.

Figure 2:
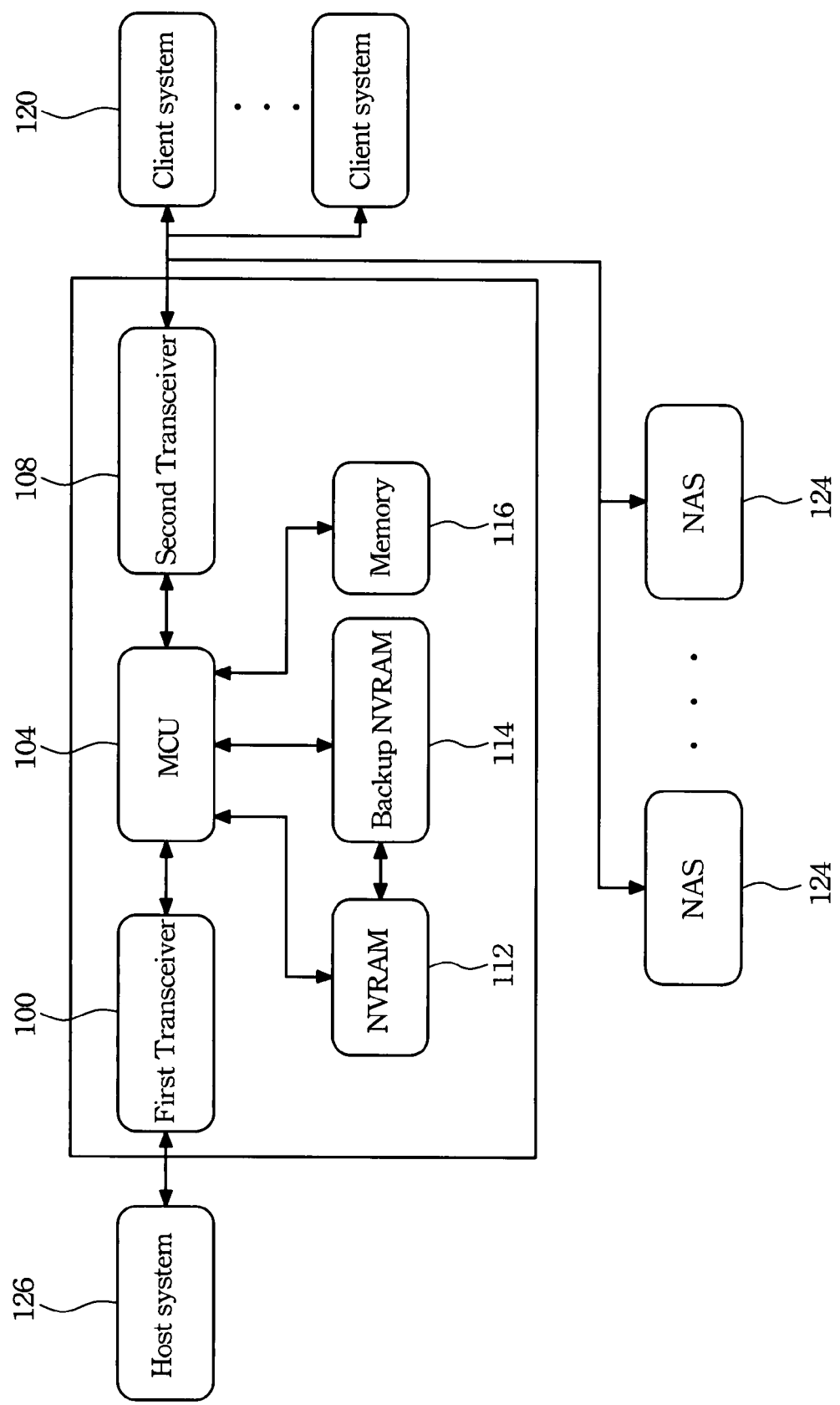
FIG. 2 illustrates a perspective view of a network communication device and a network attached storage according to one preferred embodiment of this invention.

FIG. 2 illustrates a perspective view of a network communication device and a network attached storage according to one preferred embodiment of this invention. In one preferred embodiment of the present invention, the network communication device is connected to the NAS 124 via Internet. To expand the storage capacity of the NVRAM 112, the NAS is employed to import the access record from the NVRAM 112. In addition, the backup NVRAM 114 serves as another storage space when the capacity of the NVRAM 112 runs out.

Figure 3A:
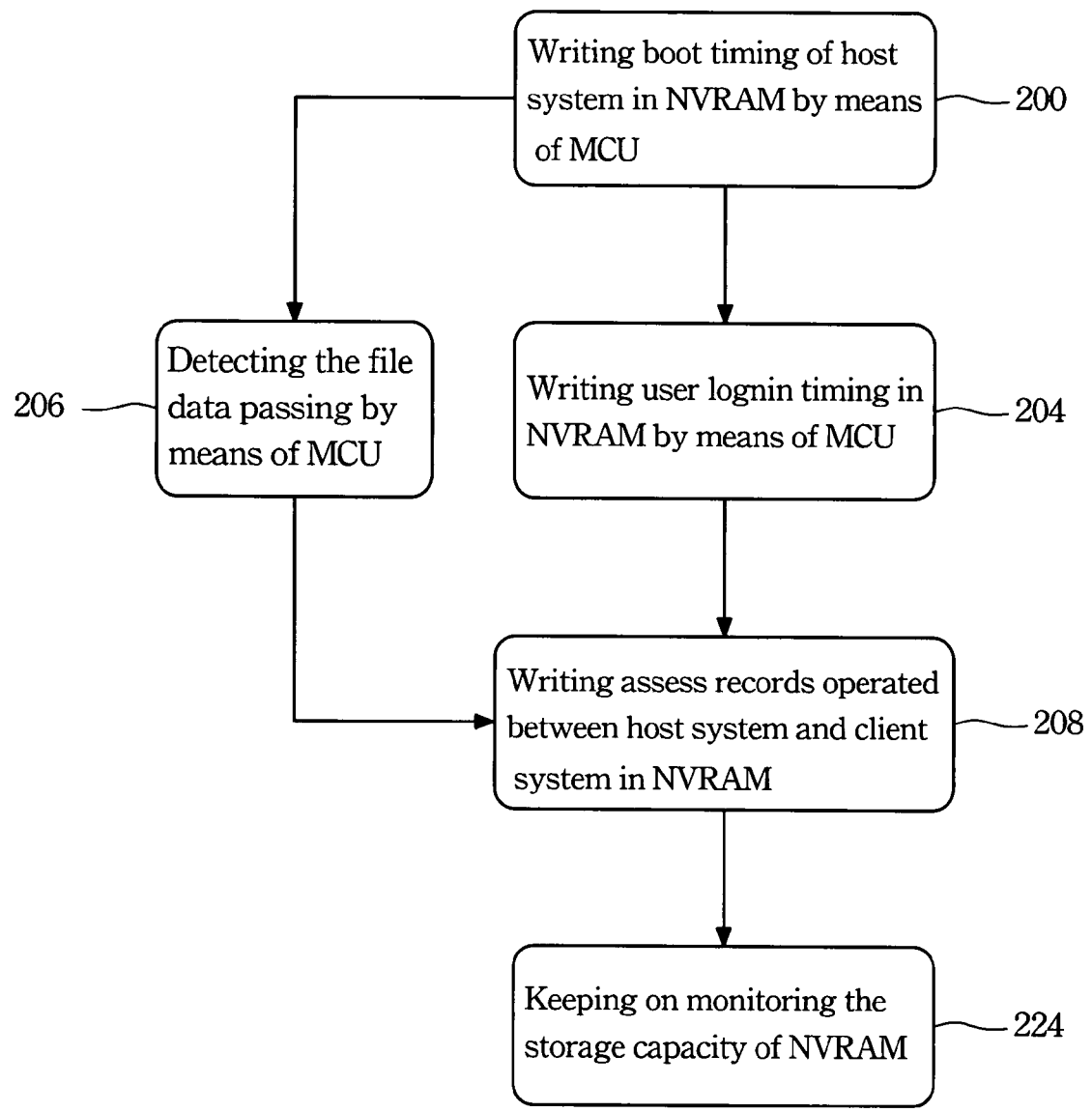
FIG. 3A illustrates a flowchart of storing the access record in NVRAM according to one preferred embodiment of this invention.

FIG. 3A illustrates a flowchart of storing the access record in NVRAM according to one preferred embodiment of this invention. Referring to FIG. 1 and FIG. 3A, the network communication device is employed to save the access record between the host system 126 and the client system 120. When the host system turns on, step 200, "writing boot-up timing of the host system 126 in NVRAM 112 by means of MCU 104", is executed. When a user accesses the client system 120 via host system 126, step 204, "writing user login timing in NVRAM 112 by means of MCU 104", is executed. When a user controls the client system 120 via the host system 126, step 208, "writing access records operated between host system 126 and client system 120 in NVRAM 112", is executed. The last step 224, "keeping on monitoring the storage capacity of the NVRAM 112", is executed to make sure that the NVRAM 112 still has enough storage capacity. When the NVRAM 112's capacity runs out, the backup NVRAM 114 serves as a backup to avoid interrupting the recording step. Moreover, step 206, "detecting the file data passing by means of MCU 104", is executed simultaneously. The access record can be operation timing, transfer access time, and IP (Internet Protocol) address data or user identification data of the client system 120 or the host system 126.

Figure 3B:
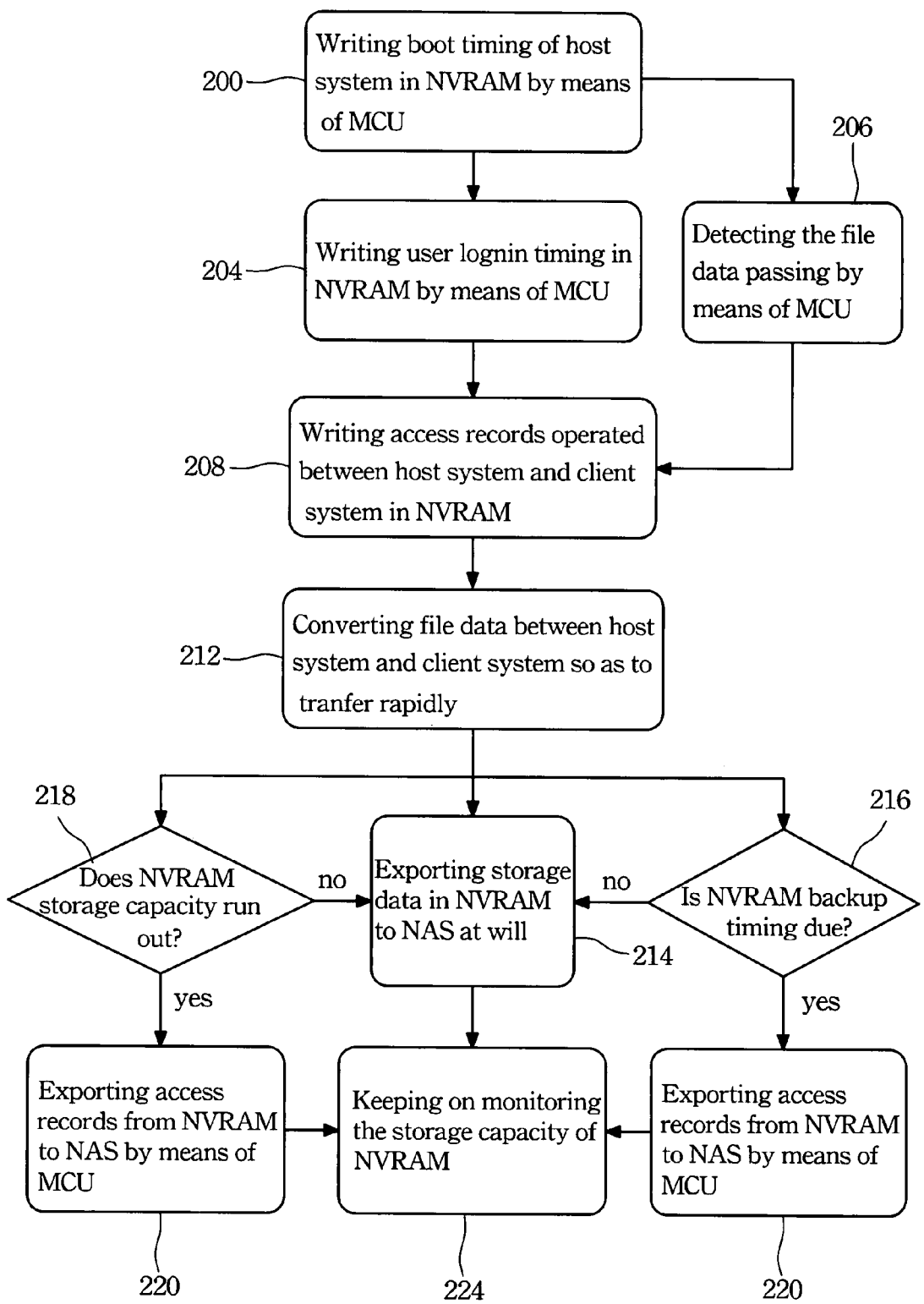
FIG. 3B illustrates a flowchart of exporting the access record in NVRAM to a network attached storage according to one preferred embodiment of this invention.

FIG. 3B illustrates a flowchart of exporting the access record in NVRAM to a network attached storage according to one preferred embodiment of this invention. Referring to FIG. 2 and FIG. 3B, the network communication device and the NAS are employed to save the access record between the host system 126 and the client system 120. When the host system turns on, step 200, "writing boot-up timing of the host system 126 in NVRAM 112 by means of MCU 104", is executed.

When a user accesses the client system 120 via host system 126, step 204, "writing user login timing in NVRAM 112 by means of MCU 104", is executed. When a user controls the client system 120 via the host system 126, step 208, "writing access records operated between host system 126 and client system 120 in NVRAM 112" is executed. The access record can be operation timing, transfer access time, and IP address data or user identification data of the client system 120 or the host system 126. When the access record is stored, the file data between the host system 126 and the client system is also recorded.

Subsequently, step 212, "converting file data between the host system 126 and the client system 120 so as to transfer rapidly", is executed. In step 212, the interface between the MCU 104 and the host system 126 can be UART, LAN, IrDA, CAN Bus, USB, IEEE 1394, RS-232, RS-422, RS-485 or Parallel Port.

In order to store more access record in the NVRAM 112, the access record in the NVRAM 112 can be exported to the NAS 124 via a network. There are several ways to exporting the access record, such as step 214, "exporting storage data in the NVRAM to NAS at will", step 216 "Is NVRAM backup timing due?", followed by step 220, "exporting access records from NVRAM to NAS by means of MCU", or step 218, "Does NVRAM storage capacity run out?", followed by step 220: exporting access records from NVRAM to NAS by means of MCU". The last step 224, "keeping on monitoring the storage capacity of NVRAM", is executed to make sure that the NVRAM 112 still has enough storage capacity. When the NVRAM 112's capacity runs out, the backup NVRAM 114 serves as a backup to avoid interrupting the recording step. Step 214, step 216, step 218 or step 220 can be executed after the host system or the network communication device is turned on.

Because Internet Protocol address and identification data is recorded in the NVRAM of the network communication device, the portable network communication device can be attached to other host systems so as to control the same client systems without anymore setting acts. Moreover, the present invention can export the access record in NVRAM of the network communication device to the NAS, which is located anywhere.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for storing an access record, applied in a network communication device connecting a host system with a client system, the network communication device having a MCU and a NVRAM, said method comprising the steps of:
   (a) writing boot-up time in the NVRAM by means of the MCU while booting said host system;
   (b) acquiring a operation status between said host system and said client system by detecting file data passing with the MCU;
   (c) writing login time in the NVRAM by means of the MCU when a user accesses said client system via said host system;
   (d) writing the access record transmitted between said host system and said client system in the NVRAM by means of the MCU; and
   (e) simultaneously monitoring the NVRAM toby means of the MCU, exporting the access record to a backup memory and informing the user.

2. The method of claim 1, wherein the access record of step (d) is exported to a NAS at will.

3. The method of claim 1, further comprising exporting the access record in the NVRAM to a NAS when a used storage capacity of the NVRAM is greater than a setting value.

4. The method of claim 1, wherein the access record is exported to a NAS when backup timing is due.

5. The method of claim 1, wherein the access record between said host system and said client system is an operation timing, transfer access time or a combination thereof.

6. The method of claim 1, wherein the access record between said host system and said client system is IP address data, user identification data or a combination thereof.

7. The method of claim 1, wherein the NVRAM is the one selected from a group consisting of a flash memory, a floppy disk, a hard disk drive or a combination thereof.

8. The method of claim 1, further comprising converting the access record between said host system and said client system according to different protocols.

9. The method of claim 1, further comprising recording the file data between said host system and said client system.

10. A method for storing an access record, applied in a network communication device connecting a host system with a client system, the network communication device having a MCU and a NVRAM, said method comprising the steps of:

(a) writing boot-up time in the NVRAM by means of the MCU while booting said host system;
(b) acquiring a operation status between said host system and said client system by detecting file data passing with the MCU;
(c) writing login time in the NVRAM by means of the MCU when a user accesses said client system via said host system;
(d) writing the access record transmitted between said host system and said client system in the NVRAM by means of the MCU;
(e) simultaneously monitoring the NVRAM by means of the MCU, exporting the access record to a backup memory and informing the user; and
(f) exporting the access record in the NVRAM to a data storage media by means of the MCU, wherein the data storage media is connected to the network communication device and said client system via a network.

11. The method of claim 10, wherein the data storage media for storing the access record in step (f) is a NAS.

12. The method of claim 11, further comprising exporting the access record in the NVRAM to a NAS when a used storage capacity of the NVRAM is greater than a setting value.

13. The method of claim 11, wherein the access record is exported to a NAS when backup timing is due.

14. The method of claim 10, wherein the access record between said host system and said client system is an operation timing, transfer access time or a combination thereof.

15. The method of claim 10, wherein the access record between said host system and said client system is IP address data, user identification data or a combination thereof.

16. The method of claim 10, wherein the NVRAM is the one selected from a group consisting of a flash memory, a floppy disk, a hard disk drive or a combination thereof.

17. The method of claim 10, further comprising converting the access record between said host system and said client system according to different protocols.

18. The method of claim 10, further comprising recording the file data between said host system and said client system.

* * * * *